United States Patent [19]

MacPhee

[11] 4,047,079
[45] Sept. 6, 1977

[54] GROUND LEAKAGE CURRENT PROTECTION SYSTEM

[75] Inventor: Colin A. A. MacPhee, West Hill, Canada

[73] Assignee: Federal Pacific Electric Co., Newark, N.J.

[21] Appl. No.: 532,819

[22] Filed: Dec. 16, 1974

Related U.S. Application Data

[63] Continuation of Ser. No. 771,451, Oct. 29, 1968, abandoned.

[51] Int. Cl.² ............................................. H02H 3/28
[52] U.S. Cl. ........................................ 361/45; 361/85
[58] Field of Search ..................... 317/18 D, 27, 26; 336/171, 173, 175; 324/51, 127; 323/56

[56] References Cited

U.S. PATENT DOCUMENTS 3,558,980   1/1971   Florance et al. ....................... 361/45

Primary Examiner—J D Miller
Assistant Examiner—Patrick R. Salce

[57] ABSTRACT

A circuit interrupter responsive to ground-fault conditions is disclosed that is rendered relatively immune to many possible failures of components and connections. A differential current transformer has a pair of differential primary windings in series with the conductors of the protected load circuit (or a ground-fault-current primary winding in a modification), and a secondary winding in control of an AC-energized SCR that controls a "hold-in" coil of a circuit interrupter, and an AC - excited biasing winding. The arrangement is such that, in the absence of ground fault current, the hold-in coil is energized, whereas in case of a ground fault the AC biasing flux is opposed so as to be cancelled or reversed, releasing the circuit interrupter for opening.

20 Claims, 2 Drawing Figures

INVENTOR.
COLIN A.A. MACPHEE

BY Richard M. Rabkin

ATTORNEY

GROUND LEAKAGE CURRENT PROTECTION SYSTEM

This is a continuation of application Ser. No. 771,451, filed Oct. 29, 1968, now abandoned.

This invention relates to means for the detection of electrical leakage currents to ground and more particularly to a fail-safe ground leakage detection system.

The problem of leakage current from electrical tools and appliances has recently achieved a certain amount of notoriety. It has been recognized that small leakage currents can cause dangerous electrical shocks. Various proposals have been made for preventing leakage currents of for somehow monitoring the electrical system or apparatus for intercepting a potentially dangerous situation before harm can occur. In connection with these efforts various system-condition responsive schemes requiring a "positive" action in response to a ground fault or leakage current have been promulgated. These system depended upon the activation of their operative components to effect opening of the monitored circuit, or the production of an appropriate signal, where those components may not have been called upon to operate for a considerable period of time. The operative components may not have been operated since the device was checked in the factory or, at best, since it was not tested in its installed location. Such devices carried with them the inherent possibility of a failure of the operative components having occurred during the interim period thus rendering the protective device, upon which the user may be relying with his life, totally ineffective. For this reason the reliability of the ground leakage detection system is highly important and any situation rendering such a safety device suspect is undesirable. It is an object of this invention to provide a ground leakage current or a fault detection system which continuously monitors the condition of the operative components thereof and which will operate in a fail-safe manner on failure of at least certain of the components.

It is still another object of this invention to provide an improved ground leakage current or fault detection system having increased sensitivity to leakage current.

It is yet another object of this invention to provide a leakage current protective device which is capable of detecting ground leakage from grounded power systems.

The foregoing objects and advantages are achieved in the illustrative ground leakage protection system described below as embodiments of the invention and its various aspects. Briefly, in one aspect of the invention there is provided a ground leakage detection system for an AC power system that incorporates a differential current transformer. Means are provided for producing a biasing level of flux in the transformer core and additional means are provided for producing an opposing flux in the core that represents the ground leakage current of the system. Switching means for indicating the presence of ground leakage current is provided. The switching means includes a holding coil whose energization is controlled by the output winding of the differential transformer. When the resultant flux level drops, due to a rise in the opposing flux produced by ground leakage current or because of the failure of a component, the switching means is operated.

In another aspect of the invention there is provided apparatus for signalling the occurrence of a ground fault in an alternating current system. The apparatus includes a ground fault signalling device and means for normally maintaining the device energized in the absence of ground leakage current below a danger threshold level. The energizing means includes a phase sensitive device which has alternating current connections of a predetermined phase to the alternating current system. The energizing means also includes a transformer having a primary alternating current bias winding coupled to the alternating current system and a secondary winding coupled to the phase sensitive device. The transformer windings are phased to render the phase sensitive device normally conducting. Means are provided for impressing excitation on the transformer representing any ground leakage current that the load and its line connections may have. The last named means is phased opposite to the biasing means for deenergizing the signalling device in response to ground leakage currents above a pre-determined level.

The nature of the invention in its various aspects and further objects and features of novelty will be better appreciated from the illustrative embodiments below in which reference is made to the accompanying drawing in which drawings.

Figures 1, 2:
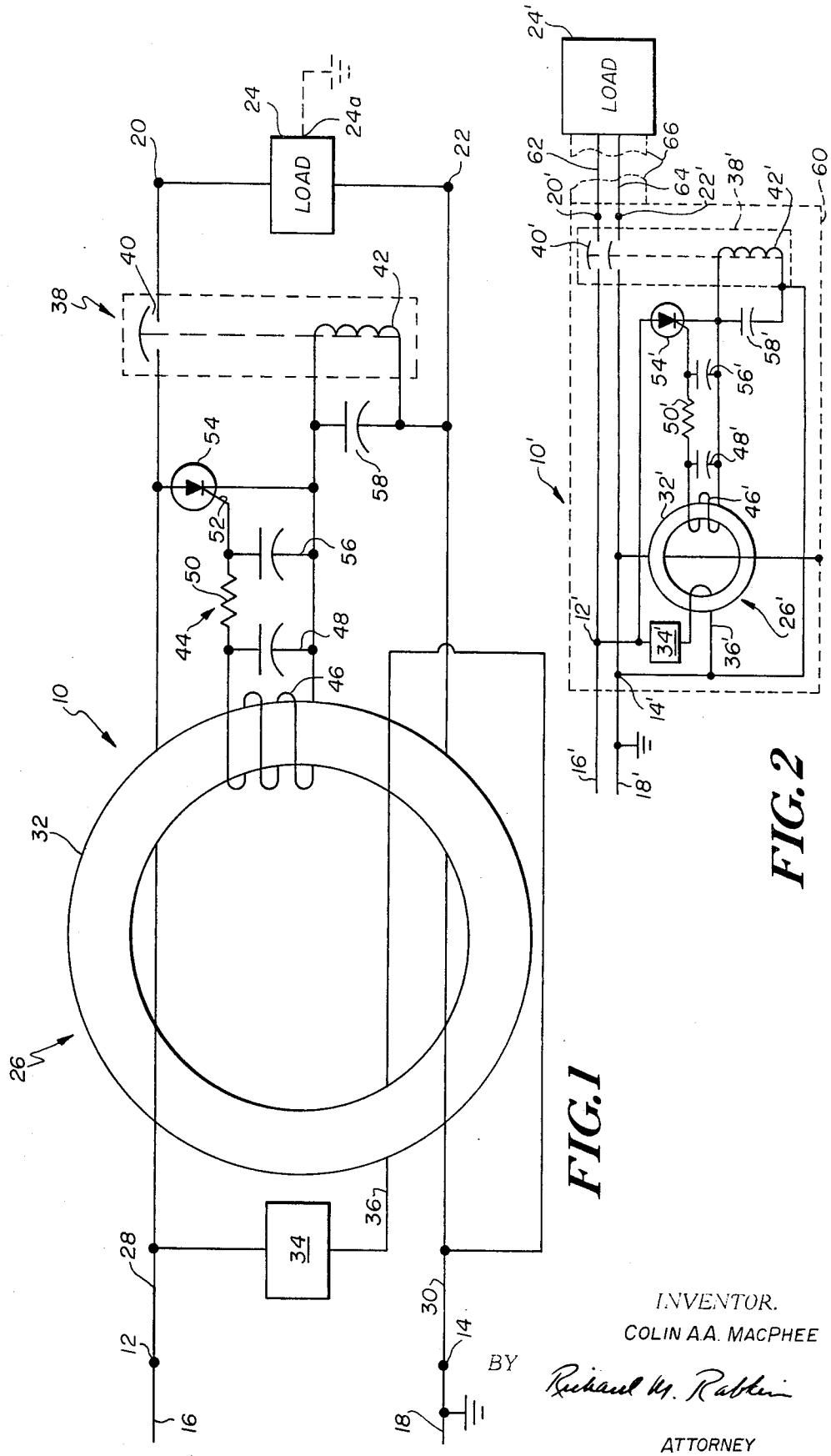
FIG. 1 is a schematic diagram of one embodiment of the invention.
FIG. 2 is a schematic diagram of a second embodiment of the invention.

Referring to FIG. 1, the ground leakage detection system 10 includes first and second line terminals 12, 14 for connection to the conductors 16, 18 of an AC power source. There are also provided first and second load terminals 20, 22 for connection to a protected load 24. The system includes a toroidal core differential current transformer 26 through which first and second conductors 28, 30 forming first and second windings pass which interconnect the first line and load terminals 12, 20 and the second line and load terminals 14, 22 respectively. The first and second conductors 28, 30 thread through the window of the toroidal differential current transformer in the same sense. By this it is meant that any flux produced in the core 32 by the same current flowing in opposite directions through the conductors 28, 30 will be cancelled. A biasing flux level, which will be explained in greater detail below, is provided in core 32 by supply means 34 that has an alternating current output of constant level within a reasonable range of voltages applied thereto. Current supply means 34 is so connected to line voltage between the first line terminal 12 and a third conductor 36 that threads the core of the differential current transformer so that flux generated in the core by the alternating current in conductor 36 is of the same frequency but in the opposite sense to the flux due to the alternating current flowing in conductor 28 alone. Third conductor 36 is connected to the second conductor 30 between the line terminal 14 and the differential current transformer 26.

The system 10 also includes a signalling device or switching means 38 that has a pair of normally open contacts 40 interposed in the first conductor 28 between the differential current transformer 26 and the load termainal 20. The switching means includes a holding coil 42 for holding the contacts 40 closed when the coil is energized by energizing means 44 which includes output winding 46 of the differential current transformer 26. Capacitor 48 is connected across the output winding and serves as a resonant burden on the winding. A current limiting resistor 50 connects one terminal of the output winding to the gate 52 of the phase sensitive device 54 which is in the presently preferred embodiment a silicon controlled rectifier (SCR). SCR 54 has its anode-cathode circuit connected between conductors 28 and 30 through the holding coil 42 of the switching means 38. Capacitor 56 is provided between the gate and cathode of SCR 54 to provide transient suppression. Capacitor 58 is provided across the holding coil to maintain the coil in its "closed contact" position on alternate half cycles when the SCR is nonconducting due to polarity reversal in the anode-cathode circuit.

In the embodiment of FIG. 1 conductors 16 and 18 are the two conductors of a single phase, 120 V (nominal) distribution circuit having one grounded conductor 18. The conductors supply power, through the ground leakage detection system 10, to the connected load 24. A biasing flux level is produced in the core 32 of the differential current transformer 26 by the supply means 34. The flux is produced by a substantially constant alternating current flowing in conductor 36 which passes through the window of the core 32 and links winding 46. The output level of current is maintained relatively constant, over a range of input voltages, by a device which may be identified as PET Type 11-T produced by Pennsylvania Electronics Technology, Inc., Pittsburgh, Pennsylvania. It will be recognized by those skilled in the art that, where input voltage variations are negligible, the supply means 34 may consist of a current limiting resistor of proper value. Since the current flowing "out" on conductor 28 is equal to the current flowing "in" on conductor 30 when no leakage current is present, the flux produced by said currents is in opposition and there is no resultant flux in the core. The biasing level of flux due to the substantially constant level alternating current source 34 produces an output signal at the gate of the SCR 54 which is in phase with the voltage applied to the SCR 54 and which is at a sufficiently great enough value to render the SCR conductive. SCR 54 connects the holding coil 42 of switching device 38 across the line thereby maintaining the normally open contacts 40 closed. Energy stored in capacitor 58 keeps the coil 42 energized on alternate half cycles when the SCR is nonconducting due to polarity reversal in its anode-cathode circuit.

In the event that ground leakage should occur, for example, at load 24a, then the current flowing "out" on conductor 28 would be different from that flowing "in" on conductor 30 by the amount of current returning via the ground path. Since conductor 18 and conductor 30 are grounded the leakage current can only flow from the "hot" conductor 28 to ground. The current unbalance produces excitation or flux in core 32 of the differential current transformer that is in opposition to the flux produced by current source 34 by virtue of their opposite sense threading of the core of the differential current transformer. When the ground leakage current reaches a level considered to be dangerous to life, the circuit is so arranged that the opposing flux produced in the core by the leakage current is sufficient to render the output of the differential current transformer out of phase with the voltage on the SCR or to reduce the output of the differential current transformer 26 to such a low level at the gate 52 that SCR 54 is not turned "on". When the SCR is "off" the holding coil 42 is de-energized and contacts 40 open disconnecting the load 24. Once the fault has been remedied contacts 40 may be reclosed by means (not shown) such as a manual lever. Further systems and appropriate signalling or switching devices are shown and described in U.S. application Ser. No. 755,228 filed Aug. 26, 1968 by W. H. Edmunds entitled Ground-Fault Protection Systems which is assigned to the assignee of the present invention. If, by chance, any of the components in the energizing circuit should fail, at any time, then the contacts 40 would return to their normally open position rendering the load 24 disconnected and safe. The described system may, therefore, be referred to as being a "fail-safe" system for at least certain modes of component failure. The entire system 10 of FIG. 1 between the line and load terminals may be contained within a portable housing so as to provide a readily transportable means of protection for devices connected thereto.

Another embodiment of the invention is illustrated in FIG. 2 wherein similar parts bear the same reference numerals primed. The embodiment of FIG. 2 monitors the return flow of leakage current through the metallic shielding of an electrical system. The ground leakage detection system 10' is mounted within a conductive enclosure 60. Load 24' is connected to terminals 20' and 22' of the system 10' by conductors 62, 64 carried in conduit 66 that is connected to the load 24' and the enclosure 60. In the case of a ground leakage fault at the load 24' or in the conduit 66, the return path of the leakage current is through the conduit 66, to enclosure 60, and then by a conductor 68 through the current transformer 26' to the grounded conductor 18'. The current flowing through conductor 68 in the event of a fault reduces the biasing flux produced by current source 34' to such a low level that SCR 54' is not turned "on" and the normally open contacts 40' of switching device 38' are allowed to open thus disconnecting the load 24'. It will be recognized by those skilled in the art that this embodiment of the invention is also "fail-safe".

While a toroidal core "window type" differential current transformer has been illustrated, a transformer having wound primaries and secondary could perform the same functions and is therefore within the contemplation of the present invention. Means may also be provided for varying the level of biasing current from the supply means 34, as for example a potentiometer or rheostat in series with the PET Type 11-T device, to provide a ready means for field calibrating the ground leakage detection system.

While two embodiments of the invention have been shown and described in detail, it will be apparent to those skilled in the art that various changes and modifications may be made therein without departing from the spirit and scope of the invention.

What is claimed is:

1. A ground leakage current protection system including first and second line terminals for connection to an AC power source and first and second load terminals for connection to a protected load, a differential current transformer including a core and having first and second windings on the core arranged to carry load current between said first line and load terminals and between said second line and load terminals, respectively, said and second windings being phased in relation to each other so that the load current carried by said windings tends to develop mutually cancelling flux in said core, said second line terminal being grounded at the side of said differential transformer remote from said load terminals, means for providing sustained AC biasing flux in said core out-of-phase with load current flux in the core produced by said first winding, switching means including a pair of normally open contacts interposed between said line and load terminals, a holding coil effective when energized for holding said contacts closed, said differential current transformer having an output winding providing an output signal in response to said AC biasing flux, and phasesensitive means responsive to the biasing flux output signal of said output winding in the absence of ground leakage current for maintaining said holding coil energized, said first and second winding producing an unbalanced flux in said core when ground leakage current occurs, said unbalanced flux opposing the biasing flux and, when of sufficient magnitude, causing de-energization of said coil and opening of said contacts.

2. A ground leakage current protection system according to claim 1 wherein said control device is a silicon controlled rectifier, said output signal of said differential current transformer being applied to the gate of said SCR, said holding coil being connected in series with the anode-cathode circuit of said SCR between said first and second conductors.

3. A ground leakage current protection system according to claim 1 wherein said differential current transformer has a toroidal core and wherein said first and second windings are single turn conductors passing through the window of said core.

4. A ground leakage current protection system according to claim 1 wherein said AC biasing means includes AC current supply means having a constant current level of output.

5. A ground leakage current protection system according to claim 1 wherein said phase-sensitive means includes a control device having a control electrode coupled to said output winding for control thereby and output electrodes in series with said holding coil, having alternating-current connections to the AC power source.

6. A ground leakage current protection system for a load connected to an AC power distribution system, said detection system including a current transformer having a core, a first and a second winding on said core, supply means having alternating current output connected to said first winding for providing biasing flux in said core and means connected to said second winding for providing a flux in opposition to said biasing flux in representing ground leakage current, switching means including a pair of operating contacts connected in series with said load and said power distribution system, a holding coil for said switching means for holding said operating contacts closed when said holding coil is energized, and energizing means for said holding coil, said energizing means including an output winding on said current transformer, and phase-sensitive means responsive to the output signal of said output winding for maintaining said holding coil energized in response to said biasing flux, whereby said holding coil is deenergized and said operating contacts open in response to said opposition flux.

7. A ground leakage current detection system according to claim 6 wherein said supply means has a constant level.

8. A ground leakage current protection system according to claim 15 wherein said energizing means includes a control device having a control electrode and a controlled output circuit, said output signal of said differential current transformer being applied to said control electrode, said holding coil being connected to said controlled output circuit for control by said control electrode.

9. A ground leakage current protection system according to claim 6 wherein said control device is a silicon controlled rectifier, said output signal of said differential current transformer being applied to the gate of said SCR, said holding coil being connected in series with the anode-cathode circuit of said SCR.

10. Apparatus for signaling the occurrence of a ground fault in an alternating current system having line terminals, a load and connections from the load to the line terminals, said apparatus including a ground fault responsive device and means for normally maintaining said ground fault responsive device energized in the absence of hazardous ground leakage current, said energizing means including a phase sensitive device for energizing said ground fault responsive device and having main alternating current connections to said alternating current system of a predetermined phase, a transformer having a primary alternating-current bias winding coupled to said alternating current system and said transformer having a secondary winding coupled to said phase sensitive device, said transformer windings and the energizing means of said phase sensitive device being phased to render said phase sensitive device normally conducting, and means for impressing excitation on the transformer representing any ground leakage current that the load and its line connections may have, said last-named means being phased opposite to said biasing winding for deenergizing said signaling device in response to ground currents above a predetermined value.

11. A ground fault circuit interrupter which comprises first and second conductors connectable between a power supply and a load; a closed magnetic core; a first primary winding on said core in series with said first conductor; a second primary winding on said core in series with said second conductor, the magnetic flux produced in said core by said second winding substantially cancelling the flux produced by said first winding when the currents in said conductors are equal; a biasing winding on said core connected across said first and second conductors; a secondary winding on said core; circuit breaker means in one of said conductors; and sensing circuit means responsive to the voltage induced in said secondary winding for maintaining said circuit breaker means closed when said voltage exceeds a preselected minimum value.

12. The interrupter of claim 11 further including means for controlling current flow through said biasing winding.

13. The interrupter of claim 11 wherein said sensing circuit means comprises: solid state switching means connected between said first and second conductors; means for triggering said switching means into its conductive state when the induced secondary voltage exceeds said preselected minimum value; and circuit breaker coil means responsive to current flow through said switching means.

14. The interrupter of claim 13 wherein said coil means is in series with said switching means.

15. The interrupter of claim 13 wherein said switching means is a controlled rectifier having its gate and cathode connected across said secondary winding.

16. A ground fault circuit interrupter which comprises first and second conductors connectable between a power supply and a load; a closed magnetic core; a first primary winding on said core in series with said first conductor; a second primary winding on said core in series with said second conductor and the second conductor being grounded at the side of the core remote from said load, the magnetic flux produced in said core by said second winding substantially cancelling the flux produced by said first winding when the currents in said conductors are equal; means connected to said first and second conductors for providing magnetic biasing current for said core in the sense opposite that produced by a line-to-ground fault at the load side of the core; a secondary winding on said core; circuit breaker means in one of said conductors; and phase-sensitive sensing circuit means responsive to the voltage induced in said secondary winding by said magnetic biasing current for maintaining said circuit breaker means closed so long as said voltage exceeds a preselected minimum value.

17. In a power distribution system including at least two load current carrying conductors receiving power from a supply circuit at the feed end and delivering power at the delivery end, one of said conductors, termed the neutral, being grounded at said feed end and the other conductor, termed the live conductor, being above ground potential, means for protecting said live conductor from current leakage to ground due to a fault creating a conductive path which bypasses said neutral conductor comprising:

a. a first circuit means establishing a predetermined reference current flow between said conductors;

b. sensing means responsive to said reference current;

c. switching means in series with said live conductor operable to be placed in conductive and nonconductive modes;

d. control means responsive to said sensing means for maintaining said switching means in conductive mode whereby said conductors may deliver current to a load at said delivery end; and e. means responsive to current flow in said live conductor through a path to ground, bypassing said neutral conductor, said last-mentioned means being operable to cancel the response of said control means, placing said switching means in nonconductive mode, thereby disrupting current flow to said delivery end.

18. A power distribution system in accordance with claim 17, wherein said sensing meand comprises the secondary winding of a transformer having a first current coil in series with said neutral conductor.

19. A power distribution system in accordance with claim 17, wherein said means responsive to current flow in said live conductor having a ground path comprises a second current coil of a transformer in series with said live conductor, said transformer having a first current coil in series with said neutral conductor.

20. A power distribution system in accordance with claim 19, wherein said current coils of said transformer are connected in bucking phase relation.

* * * * *